United States Patent
Waldner

(10) Patent No.: US 8,238,505 B2
(45) Date of Patent: Aug. 7, 2012

(54) METHOD AND CIRCUIT FOR LINE-COUPLED CLOCK GENERATION

(75) Inventor: Markus Waldner, Klagenfurt (AT)

(73) Assignee: Entropic Communications, Inc., San Diego, CA (US)

(*) Notice: Subject to any disclaimer, the term of this patent is extended or adjusted under 35 U.S.C. 154(b) by 1092 days.

(21) Appl. No.: 11/715,820

(22) Filed: Mar. 8, 2007

(65) Prior Publication Data

US 2008/0019471 A1 Jan. 24, 2008

(30) Foreign Application Priority Data

Mar. 8, 2006 (DE) .................... 10 2006 011 126

(51) Int. Cl.
*H03D 3/24* (2006.01)
(52) U.S. Cl. ........ 375/373; 375/327; 375/354; 375/362; 375/375; 375/376
(58) Field of Classification Search .......... 375/219, 375/222, 243, 295, 297, 299, 306, 321, 327, 375/359, 360, 215, 294, 316, 322, 326, 339, 375/354, 362, 371, 373, 375, 376
See application file for complete search history.

(56) References Cited

U.S. PATENT DOCUMENTS

| | | | |
|---|---|---|---|
| 4,009,449 A | 2/1977 | Agans | |
| 5,486,866 A | 1/1996 | Helfrich et al. | |
| 6,329,850 B1 | 12/2001 | Mair et al. | |
| 7,106,655 B2* | 9/2006 | Lee | 365/154 |
| 7,394,319 B2* | 7/2008 | Hirai | 331/1 A |
| 2005/0110732 A1* | 5/2005 | Kim | 345/87 |
| 2005/0265181 A1* | 12/2005 | Yen | 369/47.48 |
| 2006/0001467 A1* | 1/2006 | Fujino et al. | 327/172 |
| 2006/0203929 A1* | 9/2006 | Kwak et al. | 375/270 |
| 2006/0250160 A1* | 11/2006 | Chang et al. | 326/93 |
| 2007/0222529 A1* | 9/2007 | Carichner et al. | 331/44 |

FOREIGN PATENT DOCUMENTS

| | | |
|---|---|---|
| EP | 1 137 188 A2 | 9/2001 |
| EP | 1471745 | 10/2004 |
| GB | 2 309 841 A | 8/1997 |
| WO | WO 2004/038918 A2 | 5/2004 |
| WO | WO 2005/060105 | 6/2005 |

OTHER PUBLICATIONS

Search Report and Written Opinion dated Aug. 3, 2007, in counterpart EP application No. 1833239.
Prosecution of counterpart EP application No. EP1833239, 2007-2011.

* cited by examiner

*Primary Examiner* — Hirdepal Singh
(74) *Attorney, Agent, or Firm* — Duane Morris LLP

(57) ABSTRACT

The invention relates to a method or to a correspondingly equipped circuit for line-coupled generation of a clock (t), wherein the clock (t) is controlled in relation to a synchronization signal (hs) and by means of a closed loop (FLL) with respect to the phase and/or the frequency in relation to the synchronization signal (hs); wherein a plurality (n) of at least two count values (cn, c0-c7) is determined, wherein each of the count values (cn, c0-c7) is determined with at least one count duration number (z) of consecutive periods of the synchronization signal (hs), and wherein each of the count values (cn, c0-c7) is determined offset relative to at least one further count value (cn, c0-c7) with a count offset (v) which is different from the count duration number of consecutive periods of the synchronization signal (hs).

20 Claims, 4 Drawing Sheets

METHOD AND CIRCUIT FOR LINE-COUPLED CLOCK GENERATION

Figure 1:
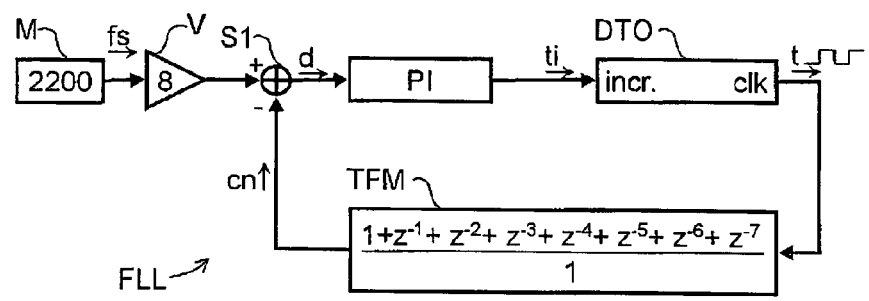

This application claims benefit/priority of German patent application No. 102006011126.5, filed Mar. 8, 2006.

The invention relates to a method for a line-coupled clock generation according to the characteristics disclosed in the preamble of claim 1, or to a circuit for the generation of a line-coupled clock according to the characteristics disclosed in the preamble of claim 1.

The generation of a line-coupled clock is important in particular for image or video ICs (IC: Integrated Circuit), wherein a closed loop having a stable phase is employed to generate the clock. Line-coupled clocks, which are frequently employed at the front end of a digital IC, must be generated with a very high phase precision, so that the entire phase deviation of the generated clock in one image line amounts only to a few percent of the clock period.

A digital PLL (Phase Locked Loop) is commonly used to generate the clock. During the phase measurement performed in this case, the phase of the generated clock is always considered relative to the actual horizontal synchronization impulse. This makes it possible to determine directly the phase deviation and, therefore to determine and stabilize the resulting frequency deviation indirectly. One advantage of such a procedure is the extremely high precision.

However, such a phase measurement also has disadvantages. In order to measure a phase value, which is below the precision of the working clock of the corresponding circuit configuration, the synchronization edges must be flattened with analog filters in order to delimit the band, so that the synchronization edges can be clearly observed in order to consequently digitize them with AD converters (AD: Analog to Digital). For such a procedure, analog filters and an AD converter capable of processing at least 8-bit data are required. In addition, the clamping of the AD converter must be well implemented so that the synchronization edges are not distorted, because this could then cause a measurement error, which, in turn, can lead to insufficient regulation, so that a resulting error would become visible as jitter in the image. Accordingly, the digital hardware that is required for phase measurement in order to ensure strong protection against interference is significant.

Moreover, it is also possible to perform processing of analog synchronization impulses externally. If, however, the closed loop is linked to a synchronization impulse, which per se is also a digital impulse in the internal part of the IC, the precision will either be lost or an additional digital circuit will be required in order to obtain the required phase information.

The object of the present invention is to propose an alternative method or an alternative circuit for the generation of a line-coupled clock. In particular, the phase measurement should not be required in this case, and, advantageously, it should be also possible to use a digital impulse or clock inside the circuit arrangement itself.

This object is achieved with the method for the line-coupled generation of a clock having the characteristics of claim 1, or with the circuit having the characteristics of the patent claim 12.

Preferred embodiments are the subject of the dependent claims.

Accordingly, preferred is a method for the line-coupled generation of a clock wherein the clock is generated in relation to a synchronization signal and the clock is regulated using a closed loop with respect to the phase and/or frequency in relation to the synchronization signal, wherein a plurality of at least two count values are determined, wherein each of the count values is determined for at least a count duration number of successive periods of the synchronization signal and wherein each of the count values is determined in a timely offset manner relative to at least a further of the count values by a count offset which is different from the count duration number of successive periods of the synchronization signal.

Also preferred is a circuit for the generation of a line-coupled clock having a clock source supplying a clock in relation to a synchronization signal, a closed loop for the regulation of the clock with respect to the phase and/or frequency in relation to the synchronization signal, and a plurality of at least two counters for the determination of a corresponding plurality of count values with at least one count duration number of successive periods of the synchronization signal, wherein the counters are configured or controlled so that the count value of at least one counter is different relative to the count value of another counter in order to determine a differing count offset of the count duration number of successive periods of staggered synchronization signal.

Such a method or circuit makes it possible to generate a line-coupled clock for video IC by means of a FLL (Frequency Locked Loop) having a stable phase. Using a very simple yet sufficiently precise frequency measurement, the desired requirements for a sufficiently precise line-coupled clock are thus achieved. The conventional phase measurement can thus be replaced with a staggered arrangement of the counters, or a staggered sequence of the counting operations in the case of an integrated circuit arrangement realized in a simple manner using a corresponding control algorithm.

The procedure essentially makes it possible regulate the actual frequency rather than the phase. A phase-locked closed loop (PLL) is generally only used because it is very precise and because it has a stable phase. With a frequency-locked loop, on the other hand, a sufficient phase stability will not be achieved and the frequency must be measured for a long time in order to achieve a more or less precise result. However, using an arrangement of counters or with counting development which is staggered in this manner, it is also possible to achieve a stable phase, theoretically at any precision level using a digital frequency-locked loop.

Accordingly, the different count values are preferably compared to each other in order to determine the phase shifting between the clock and the synchronization signal. The various count values are compared to a predetermined value in order to determine a required correction of the clock, or a required correction value.

Preferably for determining a necessary correction of the clock a clock frequency is determined by the count values and then such a determined clock frequency is compared with a desired frequency value.

With a similar procedure or with a similar circuit arrangement, the clock can be generated in an advantageous manner by means of an independent clock source deployed in an integrated circuit arrangement or with another circuit configuration, which is synchronized with an external or also an internal source provided for signal synchronization. The synchronization signal is in the case of such a use connected with a video IC, preferably a horizontal synchronization signal of a line control for image processing.

A closed loop for frequency measurement can be realized in a simple manner, while still providing a sufficient precision. For the plurality of at least two count values, a number is used that is smaller than the total number of the lines of an image signal in order to enable a quick response of the closed loop. The number of the count values or counters in a preferred case is 8. However, higher values, for example 32 or 64, can be also employed in order to increase the precision of the method or of the circuit.

When appropriate, the count duration number of the count values can be also lower than the number of image elements in one line of an image signal. When appropriate, the count duration number can in this case, while not necessarily, correspond to a plurality of count values, which preferably are value of 8, 32 or 64. The count duration number thus corresponds to the number of the periods of the synchronization signal, in particular of the horizontal synchronization signal, and at the same time also to the number of the counters, or of the count values. In principle, however, the number of the counters and the number of the counted periods of the synchronization signal can deviate from each other, in particular with respect to a whole number multiple.

Accordingly, a count offset according to a period of the clock signal is selected in such a way so that a counter or a count value is available for each period of the clock signal.

It is advantageous when a similar circuit can be achieved with a purely digital design. AD converters are then no longer required to provide a digital signal for an analog horizontal synchronization signal for the integrated circuit. With the formats of an image signal which use a separate synchronization signal for processing, the synchronization signal is usually provided in any case only as 1-bit impulse, so that the count conversion can be processed with a count offset that equals 1. In particular, in such a case, additional AD converters are no longer required, which would be otherwise required to provide a digital synchronization signal in the system, for instance with 8 bits. This includes graphic card signals, ITU interface (IT: International Telecommunication Union) signals, and naturally also signals from internal synchronization sources.

Figure 2:
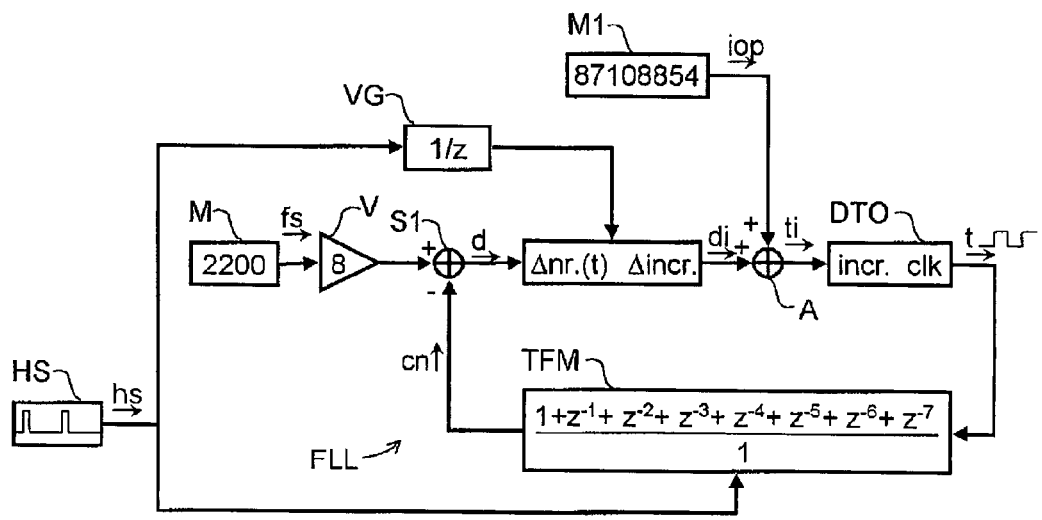
Figure 3:
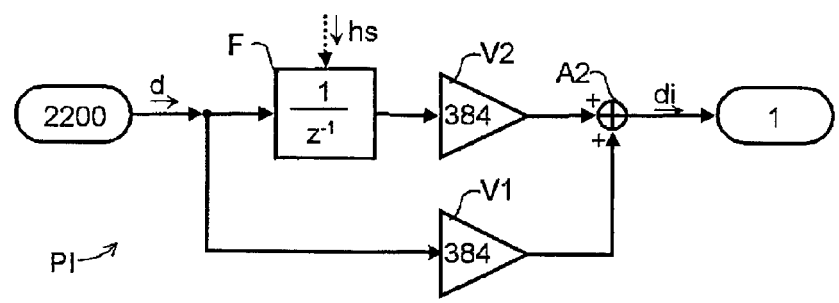
Figure 4:
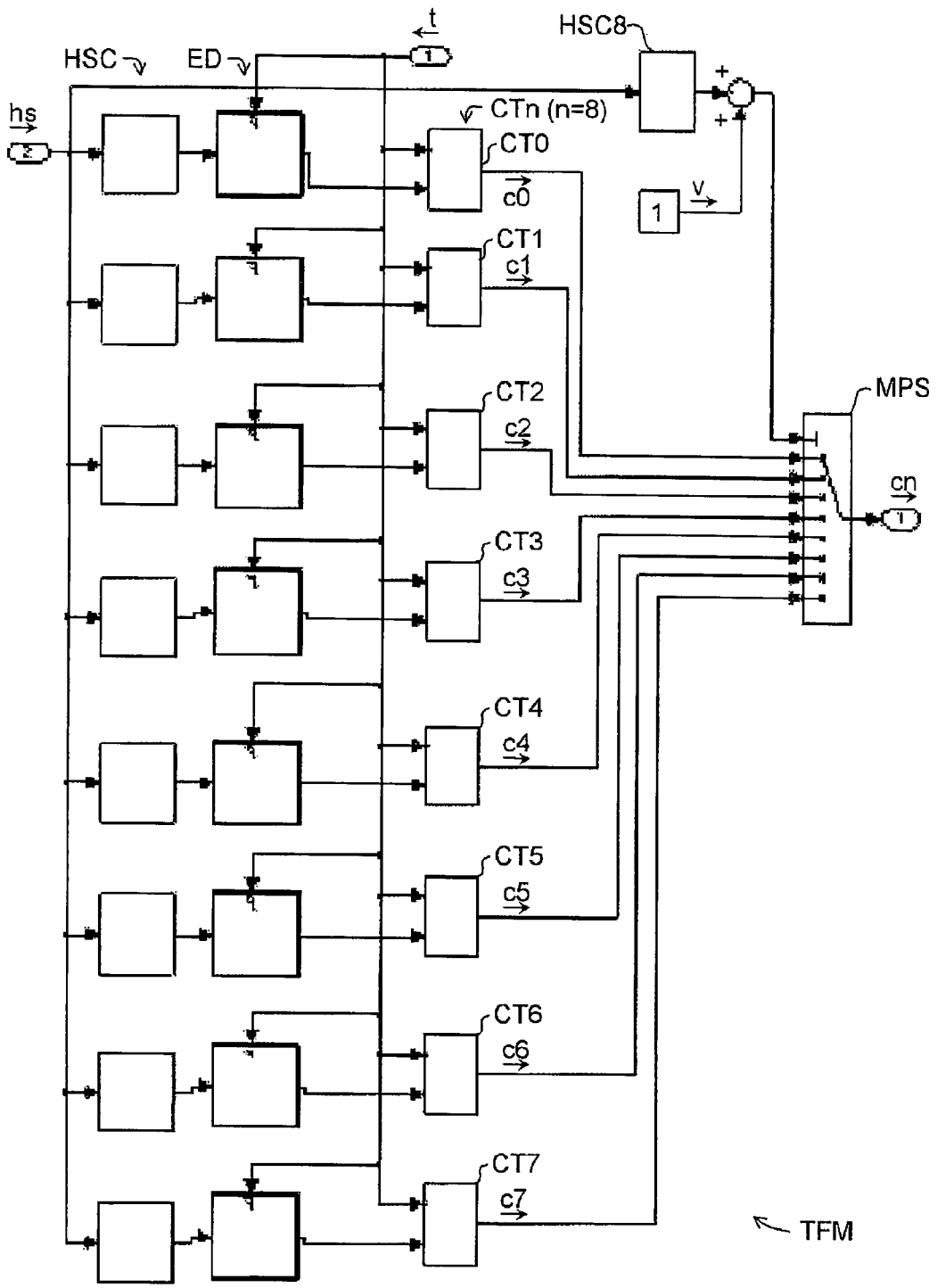
Figure 5:
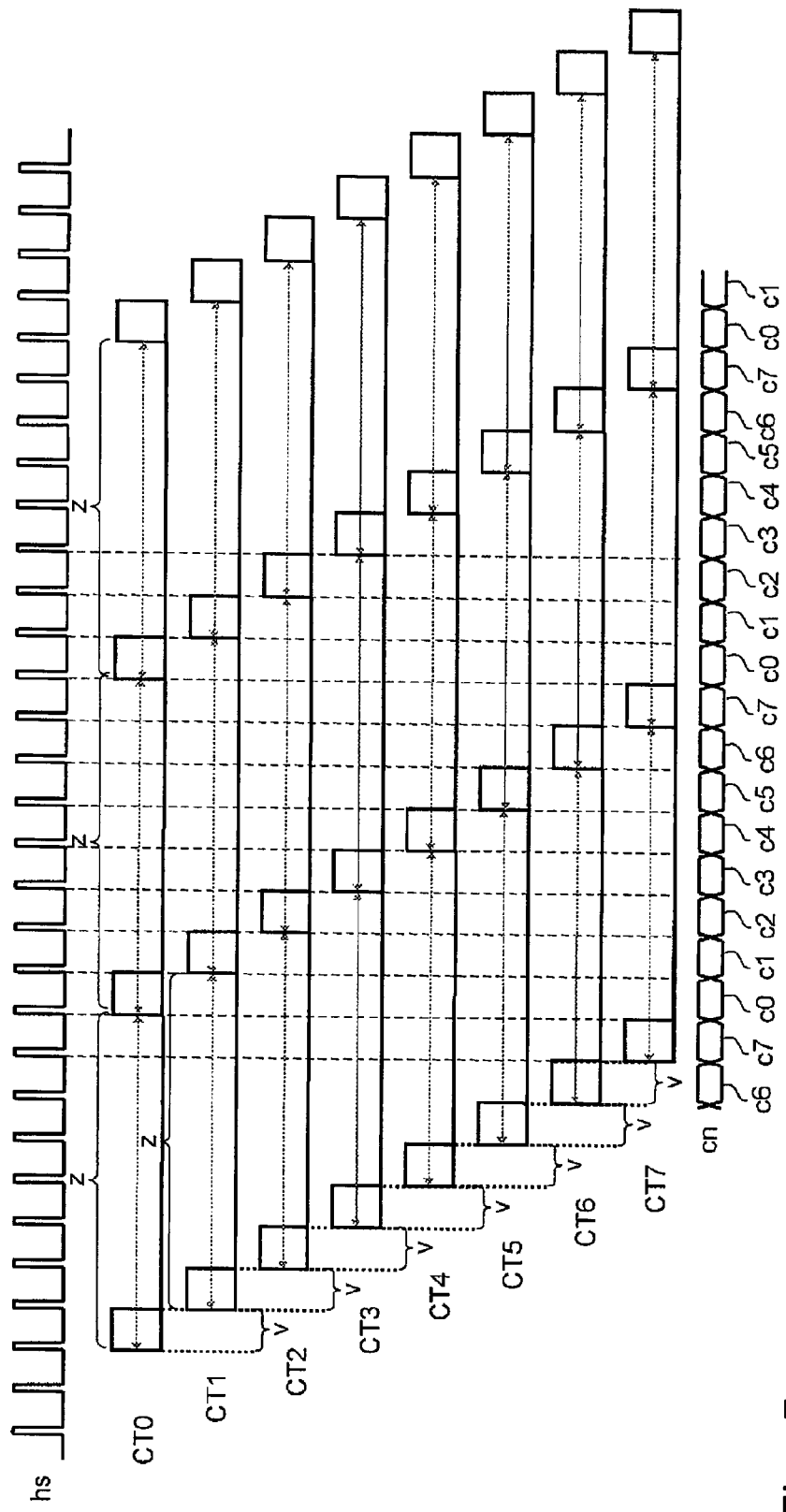
Figure 6:
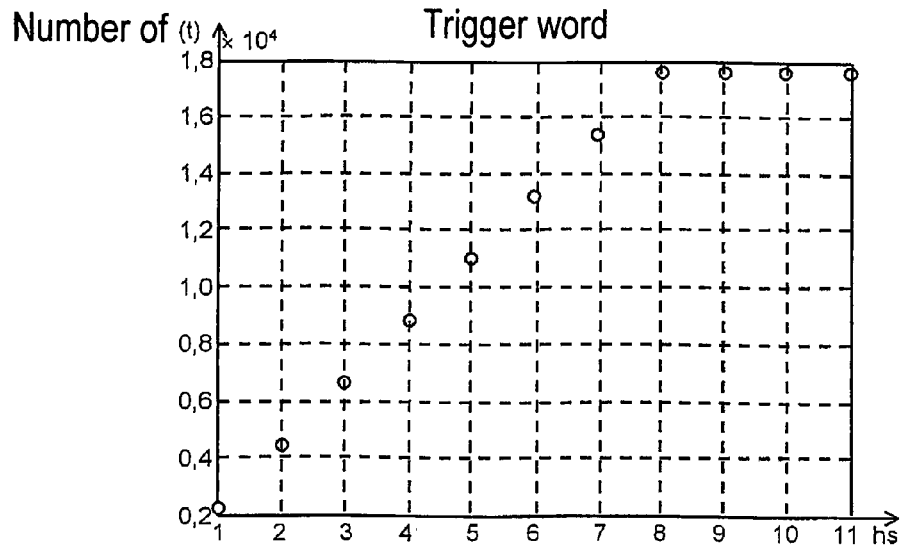
Figure 7:
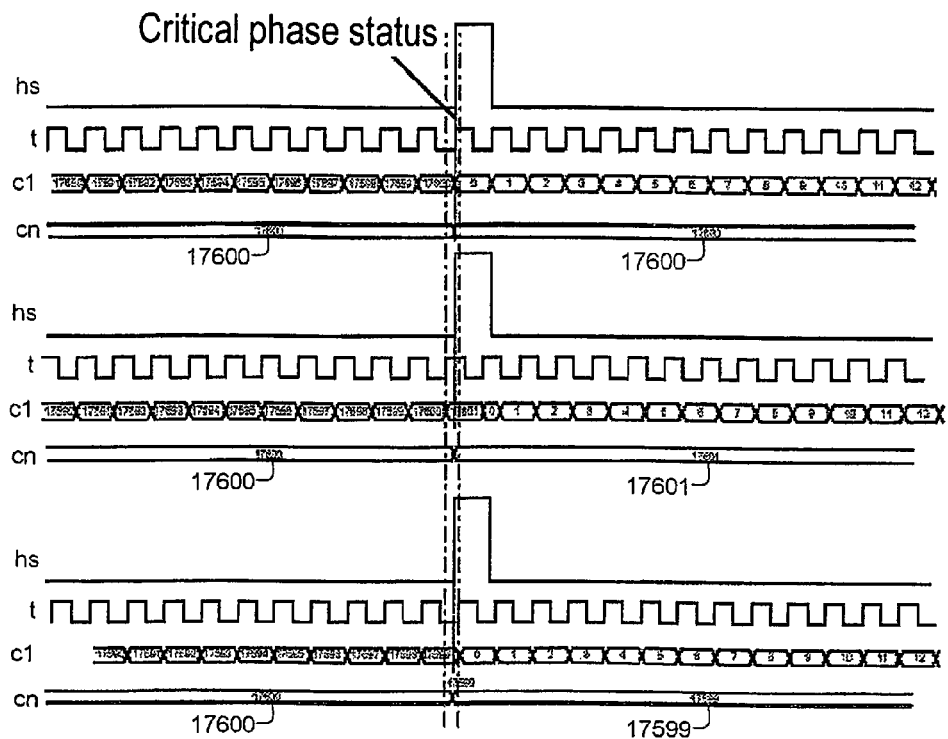

An embodiment of the present invention will now be explained in detail based on the figures. To avoid a repetitive description, preferred procedural steps, functions and circuit components are explained based on a single figure among the included figures, while the corresponding reference symbols are used also in other figures. The figures show the following:

FIG. 1 a schematic illustration of the basic principle of a circuit for line-coupled clock generation for a video IC using an FLL having a stable phase, FIG. 2 details of the circuit, FIG. 3 an example of a PI controller (PI: phase increment), FIG. 4 an example of an arrangement of counters for frequency measurement in such a circuit, FIG. 5 a series of clock diagrams of a horizontal synchronization signal and of individual counter values of the counters, FIG. 6 information provided by such a measuring system based on one clock counter, which is applied with the number of the horizontal synchronization impulses for the representation of a trigger word for one clock frequency measurement, and FIG. 7 a clock diagram showing a horizontal synchronization signal, of one clock of the circuit, of the counter values and of the counter states in an example which uses eight lines for three different phases.

FIG. 1 is a schematic illustration of one example of a circuit for the generation of a line-coupled clock t. The clock t is output according to a digital clock oscillator DTO, which is commonly also referred to as a digital timing oscillator. The clock oscillator can be provided in the form of any standard device used in digital technology. In particular, the clock oscillator DTO can be used alone or integrated in a closed loop. The clock oscillator is often connected to a control device such as a digital PLL (Phase Locked Loop), although a phase control in the form of a FLL (Frequency Lock Loop) is employed in the present example. Because the clock oscillator itself is designed with a digital circuit, and in particular, with an adder which performs adding in adjustable modulo increments, wherein the most significant bit (MSB/Most Significant Bit) is provided to an output clk, the clock oscillator DTO requires also a base clock ti. Such a base clock is usually applied to the clock oscillator DTO from an analog PLL. The base clock in this case is much higher than the clock t which is generated by the clock oscillator DTO, as a rule at least twice as high, so that the clock oscillator DTO can simply be considered as an adjustable clock divider.

The clock t provided at the clock output clk of the clock oscillator DTO is applied according to an arrangement or to a procedure for frequency measurement TFM. The frequency measurement arrangement TFM is formed using a discrete filter, which can be represented in mathematical form as a z-transform, in the case when eight supporting points are used, by $1+1z^{-1}+1z^{-2}+1z^{-3}+1z^{-4}+1z^{-5}+1z^{-6}+1z^{-7}$, wherein the sum is to be divided by 1. The mathematical transform or algorithm is is realized as a determination of a plurality of count values by means of counters which are mutually staggered. Accordingly, the TFM count values are output from the frequency measurement arrangement.

The count values cn of the frequency measurement arrangement TFM are applied to the subtraction input of a first subtraction member S1. The other input of the subtraction member S1 receives a predetermined frequency fs for a number of clocks per line, multiplied by the number of the plurality n of the count values cn. The multiple predetermined frequency fs can be at the same time also amplified. In the illustrated embodiment using eight count values cn, n=8, the multiplication factor corresponds exactly to this plurality n=8.

The result of the subtraction is applied to a PI control device PI, wherein this difference value d serves as a standard size for the PI control device. A similar PI controller usually consists of two parts, a proportionally operating P component, and an integrally operating I component, wherein commercially available components can be used for this purpose. The PI controller PI provides the base clock ti for the digital clock oscillator DTO. This makes it possible to form in this manner a closed frequency loop supplying a clock t from a digital clock oscillator DTO, which can be provided as a line-coupled clock t for a synchronization signal, in particular for image processing operations using a video IC circuit.

FIG. 2 shows a detailed embodiment form of such a circuit arrangement. Only components shown in the illustration additional to the components shown in FIG. 1 will be explained below. The core of the circuit according to FIG. 2 is again represented by a closed frequency loop FLL comprising a digital clock oscillator DTO, which supplies the clock the frequency measurement arrangement TFM, which outputs count values cn, a subtraction member S1, which subtracts the count values cn from one of the predetermined frequencies fs which are multiplied or amplified by the plurality n, and a PI control device PI, whose output value is supplied to the digital clock oscillator DTO.

The predetermined frequency value is preferably provided from a storage device M and applied to an amplifier V, which in addition to performing an amplification, for example with a factor of 2, also performs multiplication with the plurality n, in particular with the value 8. The PI control device PI also receives, in addition to the differential signal of the subtraction member S1, a synchronization signal hs in the form of a sequence of synchronization impulses of a source HS. When appropriate, the synchronization signal hs is first delayed in a delaying member VG by a unit delay 1/z, or in other words, by one clock. The PI control device PI thus operates based on a delayed synchronization signal hs and based on a control value in the form of the difference value d of the subtraction member S1. The difference value d thus corresponds to a clock difference represented by a difference between the multiplied frequency predetermined value fs and the momentary count value cn. Optionally, for instance, in the case when a circuit is used which has a fixed predetermined number of counters, it is also possible to use a correspondingly higher setting of the predetermined frequency value, which is read directly from the storage device M and applied to the subtraction member S1, instead of the predetermined frequency value fs which is multiplied with the plurality n.

The PI control device PI outputs a difference increment value, which is added by an adding member A with an operational point increment iop so as to provide the base clock ti for the digital clock oscillator DTO.

FIG. 3 shows an example of a PI control unit PI, which applies the difference value D as the difference number of the clocks. The plurality n can be, for example, used again for the counter values. The difference number of the clock in the form of a difference value d is applied both to an amplifier V1 for multiplication, which has the value of 128 in the illustrated embodiment, and to a component F for the conversion of a discrete transfer function $1/z^{-1}$. The initial value of the component F for the conversion via a transfer function, which is used to perform an adjustment with the applied synchronization signal hs, supplies with another amplifier V2 in the illustrated embodiment an amplification of 384. The initial values of both amplifiers V1, V2 are applied to another adder A2, whose addition result corresponds to the $\Delta$ increment di, which is output from the PI control device PI.

The synchronization signal is applied to the frequency measurement arrangement. An example of the construction of such an frequency measurement arrangement is schematically illustrated in FIG. 4. The synchronization signal hs is applied to a plurality n=8 of synchronization adders HSC. In this example, the synchronization signal is also applied to the clock input clk. When an edge is sensed, each of the corresponding synchronization counters HSC will apply a sense signal to a component ED used for detection of edges. The clock t is also applied as a trigger signal to the edge detection components ED. When an edge is detected, a signal and/or an impulse is each time applied by the component for edge detection ED to a synchronization input Hsync of an individually arranged counter CT0-CT7 of a group of counters CTn. In addition, the clock t is also applied in each case to the counters CT0-CT7. Each of the counters CT0-CT7 in the group of counters CTn outputs one count value c0-c7, that is to say a total of 8 count values cn in the case of an arrangement with a plurality of counters corresponding to n=8.

The count values CT0-CT7 are applied to the multi-port switch MPS, which outputs the counter values that are applied to the subtraction member S1. In addition, the synchronization signal is also applied to another, ninth synchronization counter HSC9, which performs a preliminary count and applies the value to another adder A1. The adder adds the count value to a predetermined offset or value of a count offset v and outputs the result of the addition to a switching output of the multi-port switch MPS. The count offset v is used to determine the count relationship of the clock t relative to the impulses of the synchronization signal hs, so that the count period or the number of counters can be varied relative to the number of the lines being considered. In the illustrated embodiment, which is particularly preferred, the count offset v equals 1.

The arrangement for clock frequency measurement is thus used to measure the number of the clocks t which were generated by the clock oscillator DTO in relation to the synchronization signal hs, in particular, in the form of horizontal synchronization impulses. In other words, it is thus determined how many clocks t occur between two synchronization impulses, or between two periods of the synchronization signal. In this case, the longer the time during which the measurement is realized, the more precise the measurement. In the illustrated embodiment which is provided by way of an example, one measurement is realized with a plurality n of eight counters CTn and having one count offset v, which equals 1, which is carried out with eight synchronization signal periods. To ensure that a measurement result will be always obtained only after eight periods of the synchronization signal hs, the eight counters CTn are arranged or controlled in a staggered manner, so that the counting of one period of the synchronization signal hs is always performed with an offset.

The multi-port switch periodically outputs, with each synchronization impulse or with each period of the synchronization signal hs, the actual clock number of the last eight synchronization periods as the count value cn, to which the predetermined frequency value of the corresponding multiplied value is then compared. The difference is then used as an input value of the PI controller or the PI control device.

The synchronization counter HS with the consecutive components for edge detection ED serve in this case only as a trigger for the counters which are used as the actual clock counters.

The clock counters CTn count the number of the clocks T which are generated by the digital clock oscillator DTO. In the case of a circuit for clock generation for a line-coupled operation (Line Lock Mode) of a video IC, the clocks t correspond in each case to one image element. Accordingly, with a similar application, it is expedient when the count offset v is set to 1. This ensures that the image to be sampled will not be sampled either excessively or insufficiently, but precisely with the image element frequency. The rest of the IC can be operated for image processing, and the AD converters can be also operated, which are provided in a conventional manner, with the clock t of the digital clock oscillator DTO.

FIG. 5 shows an example of the time sequence of the signals and count values of the arrangement for clock measurement TFM. The top line illustrates the development of the synchronization signal hs. The eight lines located below indicate the corresponding reactions of the individual counters CT0-CT of the group which is formed by the counters CTn. The lowermost line shows the count values cn which are output from the multi-portal switch MPS. As one can clearly see from the figure, each counter CT0-CT7 is switched on or performs counting during a first period of the synchronization signal, and then supplies for the duration of the plurality n-1 of a counter period z the value to the output. In the case of a count offset v which equals 1, the count period z corresponds to the number or to the plurality n=8 of the counters CTn. The individual counters CT0-CT7 are in this case controlled in such a way that that they are switched on or count in a manner that is mutually staggered or offset by the count offset v, so that the result is applied to the multi-port switch MPS not only after a full count period z, but also after the duration of one of each of the count offsets v.

Accordingly, the current count value cn is output to the multi-port switch MSP, which cyclically counts the number of the image elements in one line with the number of the clocks. Accordingly, other components and procedural steps or functions are also provided in the circuit, such as for example components and functions for resetting of the counter CTn at the end of each line.

For example, it can be supposed that the frequency of the clock t is to be achieved which is no more inaccurate than an eight of a clock period per line. In this case, according to a particularly preferred embodiment, the clock will be counted only in eight lines by means of the plurality n of eight counters CTn. In addition, the regulation should be configured in such a manner that the deviation of all eight lines is maintained within ±1 clock, so that the given condition is satisfied. Naturally, regulation which only handles all eight lines takes a very long time. A faster design can be achieved with the staggered arrangement of the counters using a count offset v of the clock period in each case.

Moreover, phase stability can be also achieved because the clock t must first deviate by a full clock period; so as to achieve quickly phase stability, a staggered sequence of count value is obtained with the eight counters CT0-CT7, which are mutually offset by a count offset v measured via a period of eight lines, which results in a graduated sequence of count values.

FIG. 6 shows for such a case an example of a trigger word of the frequency measurement system, which is provided with a filter, and/or an arrangement for frequency measurement TFM in the feedback branch of the phase coupled frequency servo loop FLL. The number of the clocks t is shown above the number of periods of the synchronization signal hs. A stable status is achieved already after a count duration number z of eight periods of the synchronization signal hs.

At this point, approximately $1.8 \times 10^4$ clocks t are achieved per line with a typical clock rate. With a trigger word of such a measurement system, one can see that a full clock number is clearly visible naturally only after eight lines; however, intermediate results are already delivered. The transfer function in this case corresponds to the transfer function of an FIR filter (FIR: Finite Impulse Response).

The circuits according to FIGS. 1 and 2 take into account such a transfer function in a closed control loop.

This makes it possible to obtain, in each line, information as to how precise the clock T was during the last n=8 lines. If the count value cn is too large or too small by the value 1, control can be implemented immediately for a readjustment with the PI control device PI.

In order to explain the achievable phase stability, it will be first assumed that the system is in a transient state and all the counters CTn, CT0-CT7 display after eight lines the same counter status and/or count value c0-c7. In such a case, based on physical reality, the fact is that the synchronization signal hs will be affected by a phase drift when the frequency is not precisely adjusted. If the phase drift has progressed to such an extent that a first counter CTn, CT0-CT7 counts with its count value c0-c7 by more or less than the value 1 compared to the previous counter CTn, control is initiated to counter this alteration. The result of the control is that the clock t is slower or even begins to drift in the opposite direction. A similar type of miscounting does not, however, occur in a particular location, but is dependant on the phase status between the synchronization signal hs and the clock t, which is schematically illustrated by FIG. 7. If the rising edges of the synchronization signal hs and of the clock t are exactly next to each other, the circuit arrangement can no longer forecast whether the momentary clock t is still counted, or whether it is no longer counted. This situation is illustrated in the upper three timing diagrams shown in FIG. 7. The top line shows in this case the synchronization signal hs with a single impulse, whose rising edge timely coincides with a rising edge of a clock t in the line shown below. The line shown below indicates the momentary counter status. The fourth line shows the respective counter status after eight lines, which corresponds to the period of the impulse of the synchronization signal hs in the present embodiment.

When the control is applied in the direction which is opposite to the previous phase drift, the same process takes place again, so that the clock phase is ultimately left to hang precisely during this transition, because a circulating control is initiated exactly at this point. ???The width of the circulation will in this case correspond to +/−1 clock, when a corresponding design of the PI controller PI is realized. In total, this corresponds again at the most to ⅛ clock period. In other words, in order to detect an alteration of one counter by 1, a drifting of a whole clock period of the clock t is no longer necessary, but rather only a drifting of more than a maximum of ⅛ of the period the clock t.

One can clearly see from FIG. 7 in which the counter status is obtained in the case of the critical phase status, with an identical transition of the synchronization signal hs and of the clocks t first at the value of 17,600, which is reset with the synchronization impulse of the synchronization signal hs to 0. In a similar case, the momentary counter status is retained, which is to say the counter value cn that is output from the multi-port switch MPS will remain after the switch actuation at the value of 17,600. In the signal timing diagram shown in the center of FIG. 7, the impulse of the synchronization signal hs is timely somewhat behind the corresponding edge of the clock t, which leads to a counter value cn of 17,601 and to a shortened interval with the reset counter status. Accordingly, a counter value cn of 17,601 will be output from the multi-port switch MPS after the transition of both signals.

As shown in this diagram, the clock t is thus aligned somewhat before the synchronization signal hs. As shown in the sequence of the timing diagram below, the rising edge of the clock t is aligned somewhat behind the rising edge of the synchronization signal hs, while both edges are still within the critical phase status of ⅛-clock period of the clock t. As a consequence, the momentary counter value is still at the value of 17,599, so that thereafter, the counter value 17,599 will be output from the multi-port switch MPS as the counter status after eight lines.

Based on this essential principle, the plurality n of the counters CTn, the count duration number z of the impulses of the synchronization signal hs, with which counting is performed once per a counter, and/or the count offset v can be adjusted according to the desired precision. In order to increase the precision, the number of the plurality n of the counters can be increased, for example to 32 to 64.

The invention claimed is:

1. A method for line-coupled generation of a clock, comprising:
providing the clock in relation to a synchronization signal;
controlling the clock using a closed frequency locked loop with respect to the phase and/or frequency in relation to the synchronization signal;
determining a plurality of count values such that each of the count values is determined for at least one count duration number of consecutive periods of the synchronization signal;
wherein each of the count values is aligned offset relative to at least a further count value by a count offset which is different from the count duration number of consecutive periods of the synchronization signal; and determining a correction for the clock based on a comparison of the different count values, wherein determining the correction for the clock further comprises determining a clock frequency, and comparing the clock frequency to a predetermined frequency value.

2. The method according to claim 1, further comprising comparing the values of the different count values in order to determine a phase shifting between the clock and the synchronization signal.

3. The method according to claim 1, wherein providing the clock in relation to the synchronization signal further comprises generating the clock using an independent clock source and providing the clock such that the clock is synchronized with the synchronization signal.

4. The method according to claim 3, wherein the synchronization signal comprises a horizontal synchronization signal of a line in a circuit for image processing.

5. The method according to claim 1, wherein the closed loop is configured to perform frequency measurements.

6. The method according to claim 1, wherein the count offset corresponds to one period of the clock signal.

7. A method for line-coupled generation of a clock, comprising:
    providing the clock in relation to a synchronization signal;
    controlling the clock using a closed frequency locked loop with respect to the phase and/or frequency in relation to the synchronization signal;
    determining a plurality of count values such that each of the count values is determined for at least one count duration number of consecutive periods of the synchronization signal;
    wherein each of the count values is aligned offset relative to at least a further count value by a count offset which is different from the count duration number of consecutive periods of the synchronization signal; and
    wherein the plurality of at least two count values comprises a number of count values that is smaller than the total number of the lines of an image signal.

8. The method according to claim 7, wherein the count duration number of the count values equals the number of count values.

9. The method according to claim 7, further comprising comparing the values of the different count values in order to determine a phase shifting between the clock and the synchronization signal.

10. The method according to claim 7, further comprising determining a correction for the clock based on a comparison of the different count values.

11. The method according to claim 10, wherein determining the correction for the clock further comprises determining a clock frequency, and comparing the clock frequency to a predetermined frequency value.

12. The method according to claim 7, wherein providing the clock in relation to the synchronization signal further comprises generating the clock using an independent clock source and providing the clock such that the clock is synchronized with the synchronization signal.

13. The method according to claim 12, wherein the synchronization signal comprises a horizontal synchronization signal of a line in a circuit for image processing.

14. The method according to claim 7, wherein the closed loop is configured to perform frequency measurements.

15. The method according to claim 7, wherein the count offset corresponds to one period of the clock signal.

16. A method for line-coupled generation of a clock, comprising:
    providing the clock in relation to a synchronization signal;
    controlling the clock using a closed frequency locked loop with respect to the phase and/or frequency in relation to the synchronization signal;
    determining a plurality of count values such that each of the count values is determined for at least one count duration number of consecutive periods of the synchronization signal;
    wherein each of the count values is aligned offset relative to at least a further count value by a count offset which is different from the count duration number of consecutive periods of the synchronization signal; and
    wherein the count duration number of the count values is smaller than the number of the image elements in one line of an image signal.

17. The method according to claim 16, wherein the closed loop is configured to perform frequency measurements.

18. A circuit for line-coupled generation of a clock, comprising:
    a clock source configured to provide a clock in relation to a synchronization signal;
    a closed frequency locked loop configured to control the clock with respect to the phase and/or frequency in relation to the synchronization signal;
    a plurality of counters is provided to determine a corresponding plurality of count values, each count value having at least a count duration number of consecutive periods of the synchronization signal,
    wherein the plurality of counters are configured or controlled such that the count value of at least one counter is different relative to the count value of another counter in order to determine a differing count offset of the count duration number of successive periods of the synchronization signal; and
    a determination device configured to determine a clock frequency using one or more of the plurality of count values and to compare the clock frequency to a predetermined frequency value.

19. The circuit according to claim 18, further comprising an image processing circuit configured to provide the clock such that the clock is synchronized with the synchronization signal, the synchronization signal comprising a horizontal synchronization signal of a line.

20. The circuit according to claim 18, wherein the locked loop (FLL) is configured to carry out frequency measurement and/or frequency control.

* * * * *